J. C. MacLACHLAN.
ELASTIC WHEEL.
APPLICATION FILED APR. 22, 1909.
988,201.
Patented Mar. 28, 1911.
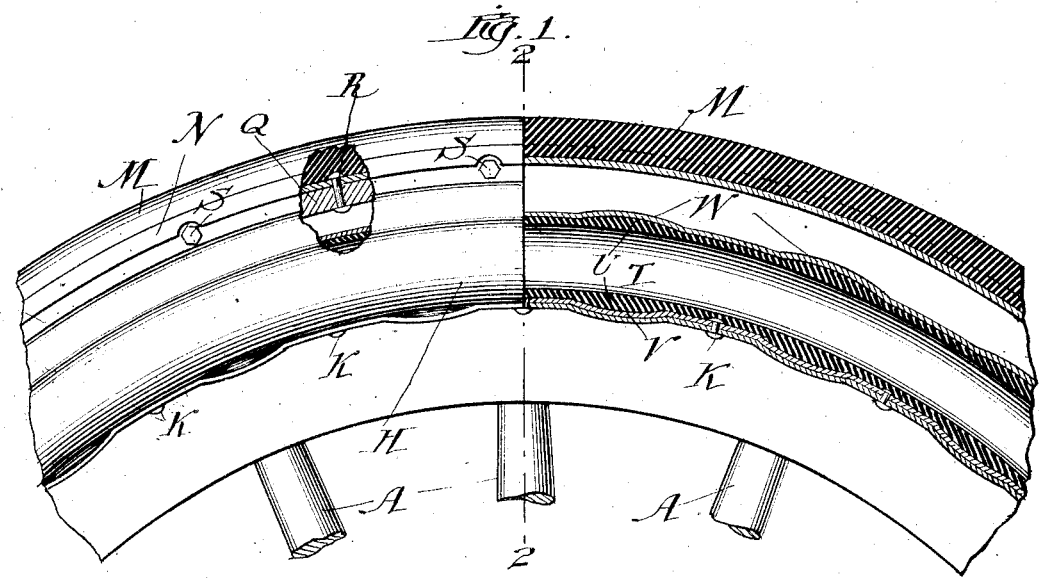
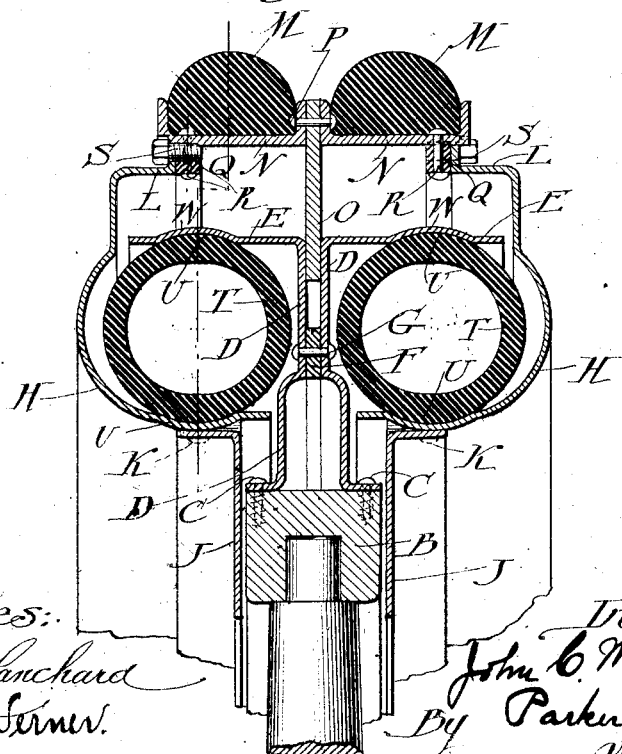

UNITED STATES PATENT OFFICE.

JOHN C. MacLACHLAN, OF CHICAGO, ILLINOIS, ASSIGNOR, BY DIRECT AND MESNE ASSIGNMENTS, OF THREE-FOURTHS TO ALBERT P. HUNT, OF CHICAGO, ILLINOIS.

ELASTIC WHEEL.

988,201.   Specification of Letters Patent.   Patented Mar. 28, 1911.

Application filed April 22, 1909. Serial No. 491,561.

*To all whom it may concern:*

Be it known that I, JOHN C. MACLACHLAN, a citizen of the United States, residing at Chicago, in the county of Cook and State of Illinois, have invented a certain new and useful Improvement in Elastic Wheels, of which the following is a specification.

My invention relates to elastic wheels and particularly a device for protecting the tire which is preferably in the nature of a pneumatic tire.

It is illustrated in the accompanying drawings wherein—

Figure 1 is a side elevation of a portion of a wheel rim with parts broken away and parts shown in section on the section line of Fig. 2. Fig. 2 is a cross section on the line 2—2 of Fig. 1 with parts broken away.

Like parts are indicated by the same letter in both figures.

A, A are spokes of the wheel secured at their outer ends to the felly B. Around this felly and secured to its outer surface by screws C are two oppositely faced but separated flanged rings consisting each of the portion D and the lateral portion E. The two flanged rings are separated by the large washer F and are secured together by the transverse bolts G.

H, H are case sections shaped in any desired manner, but preferably as shown and provided each with an inner flange J which may be secured to the section by the screws K, K and an outer flange L which may be integral with the section. The two flanges J, J inclose the felly and the ends of the spokes and protect the cavity between the sections.

M, M are solid tires seated each in a channel rim N. These two rims are secured together and to an intermediate guide flange O by means of the transverse rivets P. The guide flange O enters the recess between the separated portions of the flanged rings D D. The case sections are secured together as follows: A ring Q, is secured by means of the rivets R to the inner face of the rims N and the flange L on the section H is brought into the angle between the ring and the rim and there secured by the transverse screws S.

T, T are pneumatic tires preferably provided with the enlargements U to be received into the depressions V in the lower part of the case sections, and similar depressions W in the horizontal parts E of the flanged rings.

The several features and elements of construction here shown could be materially changed and varied and some of them dispensed with without departing from the spirit of my invention, but I shall point out in the claims what I consider as of the essence of my invention.

The use and operation of my invention are perhaps sufficiently clear from the foregoing. On the outside of the felly are securely mounted the flanged rings D, the upper laterally projecting parts E furnishing one side of the receptacle in which the pneumatic tire is to rest. The case sections are then brought together and assembled with the channel rims in the manner shown. As the wheel rotates on the ground the pressure is received upon the pneumatic tires, the case which holds them, moving with reference to the felly or wheel as the tires expand or are compressed. The central guide flange keeps the solid tires and their associated parts in proper relation to the wheel and prevents lateral movement and noise. At the same time the pneumatic tires are very completely incased or inclosed, the cavity which contains them being on its outer part entirely closed.

I claim:

1. A tire case comprising a felly, a part rigid on the felly which is provided with an annular slot therein and forms two inner vertical and two outer lateral walls for the tire, a part movable with respect to the felly and forming two inner lateral and two outer vertical walls for the tire and a flange on the movable part in engagement with the walls of said slot.

2. A wheel comprising spokes, a felly, a T-shaped annular member rigidly attached to said felly having a slot therein, a pneumatic tire upon either side of the T-shaped member, a slotted annular casing surrounding said T-shaped member and the felly, said tire interposed between said casing and said T-shaped member, and an inwardly projecting ring upon said casing in engagement with the walls of the slot within said T-shaped member to act as a guide for said casing.

3. A wheel comprising a felly and spokes an elastic tire thereabout, a frame rigid on the felly and T-shaped in cross-section and forming two inner vertical and two outer lateral walls for the tire, a casing movable with respect to the felly and forming two inner lateral and two outer vertical walls for the tire, the casing having flanges secured thereto which inclose the felly and ends of the spokes.

JOHN C. MacLACHLAN.

Witnesses:
EDNA K. REYNOLDS,
SOPHIE B. WERNER.